(12) United States Patent
Zimmermann

(10) Patent No.: US 6,634,793 B2
(45) Date of Patent: Oct. 21, 2003

(54) SHAFT SUSPENSION SYSTEM FOR DRIVE SHAFTS OF MOTOR VEHICLES

(75) Inventor: Dirk Zimmermann, Ampfing (DE)

(73) Assignee: SGF Süddeutsche Gelenkscheibenfabrik GmbH & Co. KG, Waldkraiburg (DE)

( * ) Notice: Subject to any disclaimer, the term of this patent is extended or adjusted under 35 U.S.C. 154(b) by 0 days.

(21) Appl. No.: 10/050,204

(22) Filed: Jan. 16, 2002

(65) Prior Publication Data

US 2003/0072510 A1 Apr. 17, 2003

(30) Foreign Application Priority Data

Jan. 17, 2001 (DE) .......................................... 101 01 947

(51) Int. Cl.[7] ............................................... F16C 19/06
(52) U.S. Cl. ...................................................... 384/536
(58) Field of Search ................................. 384/220, 221, 384/222, 536, 582

(56) References Cited

U.S. PATENT DOCUMENTS 3,325,230 A    6/1967   Caunt
3,869,113 A  * 3/1975   Dudek ........................ 384/221
5,399,309 A  * 3/1995   Simmons ..................... 384/221

FOREIGN PATENT DOCUMENTS

JP            100 53 035 A    2/1998

* cited by examiner

Primary Examiner—Lenard A. Footland
(74) Attorney, Agent, or Firm—Webb Ziesenheim Logsdon Orkin & Hanson, P.C.

(57) ABSTRACT

A shaft suspension system has a rigid inner ring designed for receiving a shaft bearing, a rigid outer ring surrounding the inner ring with radial clearance, a resilient connecting member bridging the clearance between inner ring and outer ring, and a bearing support which extends about the outer ring and includes lugs for fastening it to the bottom of a motor vehicle. The bearing support is composed of a support plate on which the lugs are formed, a loop and an elastomer member in which the loop is embedded. The loop is made from one or several strands of steel wire or yarns of natural or synthetic fibers, suspended from the support plate and extends about a part of the outer ring. This suspension results in a specifically good structure-borne noise insulation and allows axial movements of the suspended shaft which may occur, for example, on a vehicle running on a rough road.

12 Claims, 3 Drawing Sheets

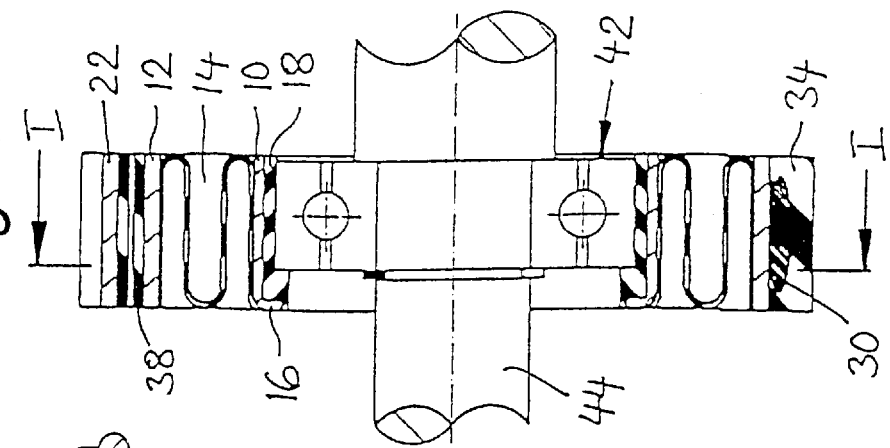
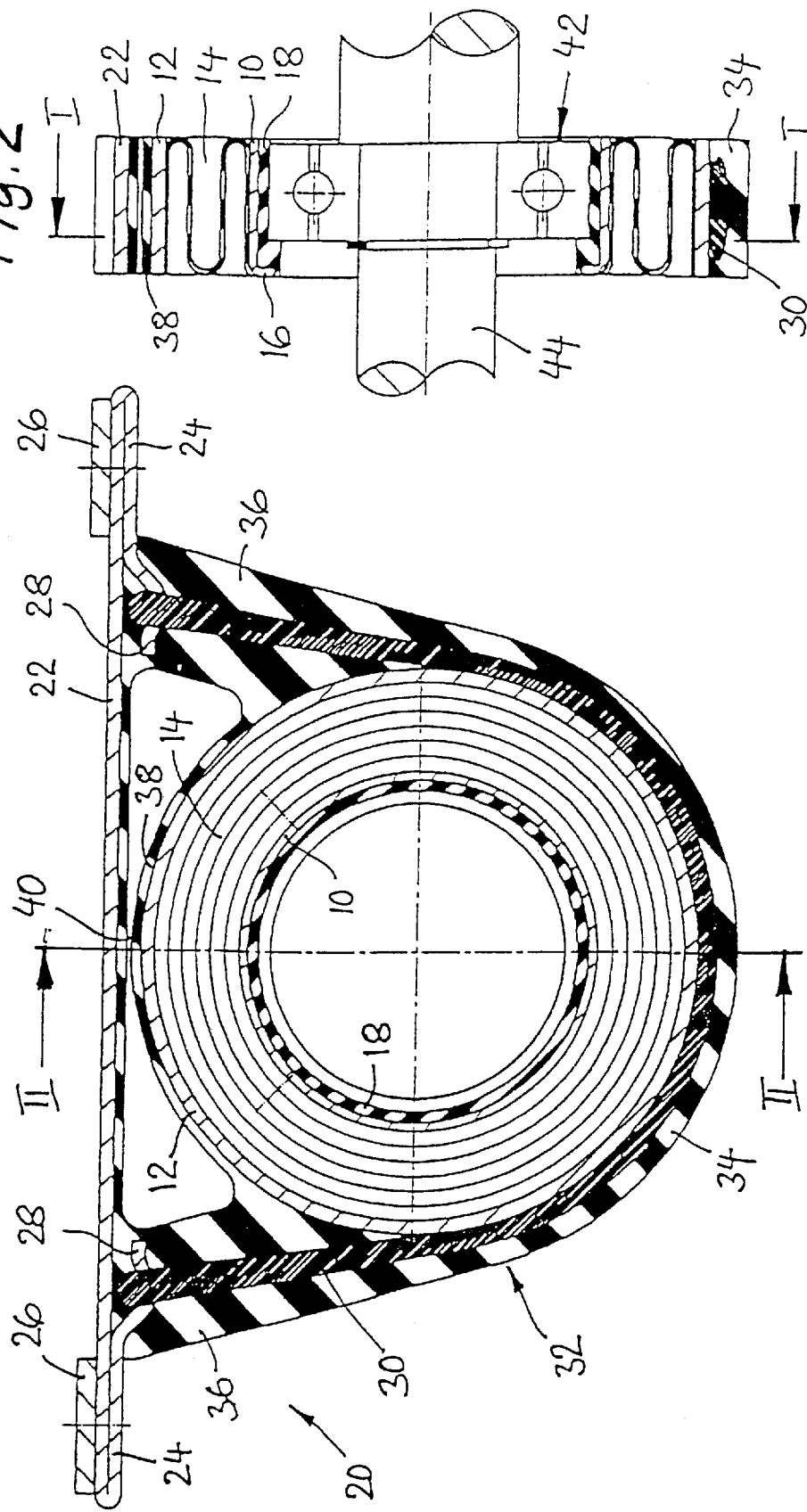

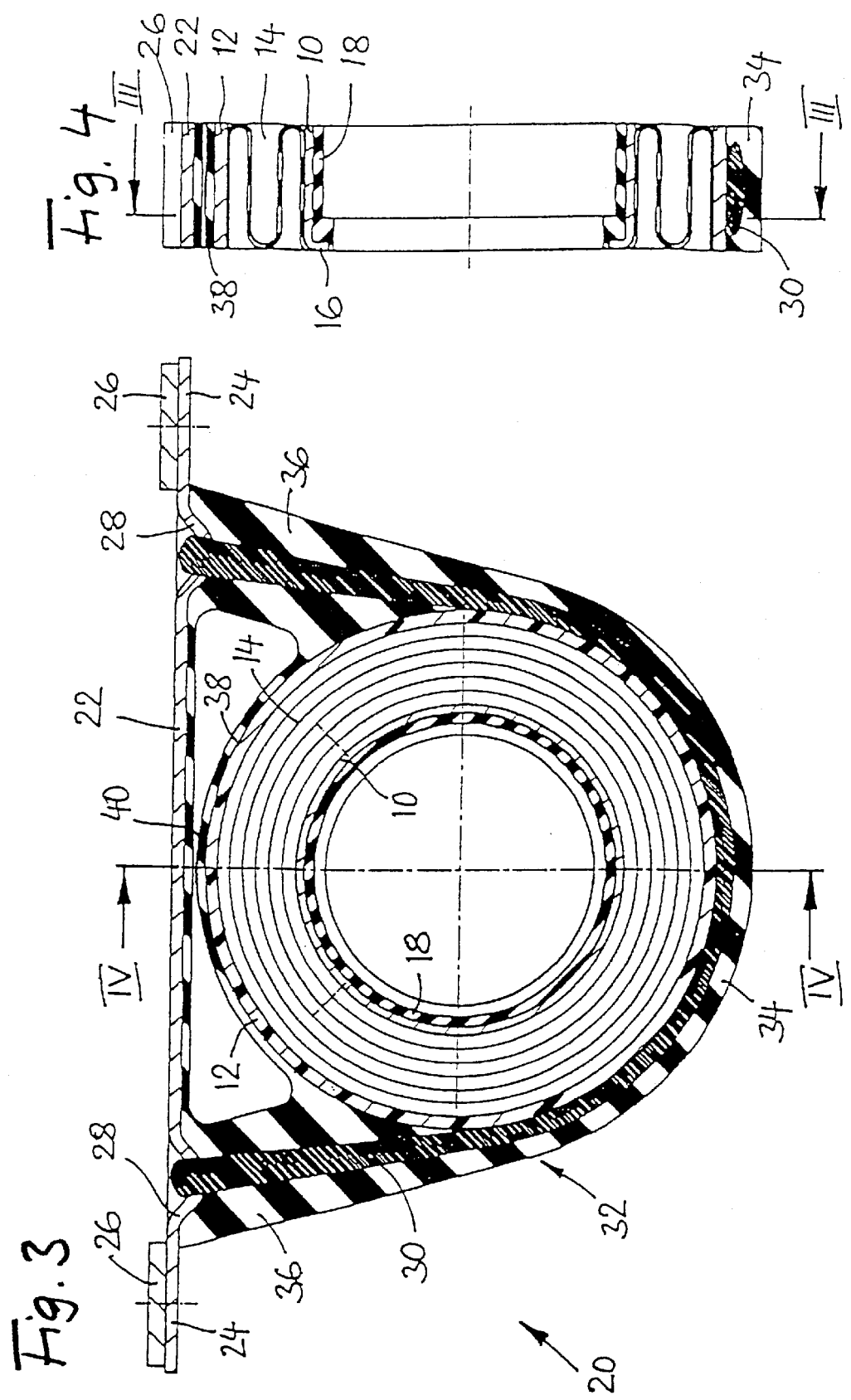

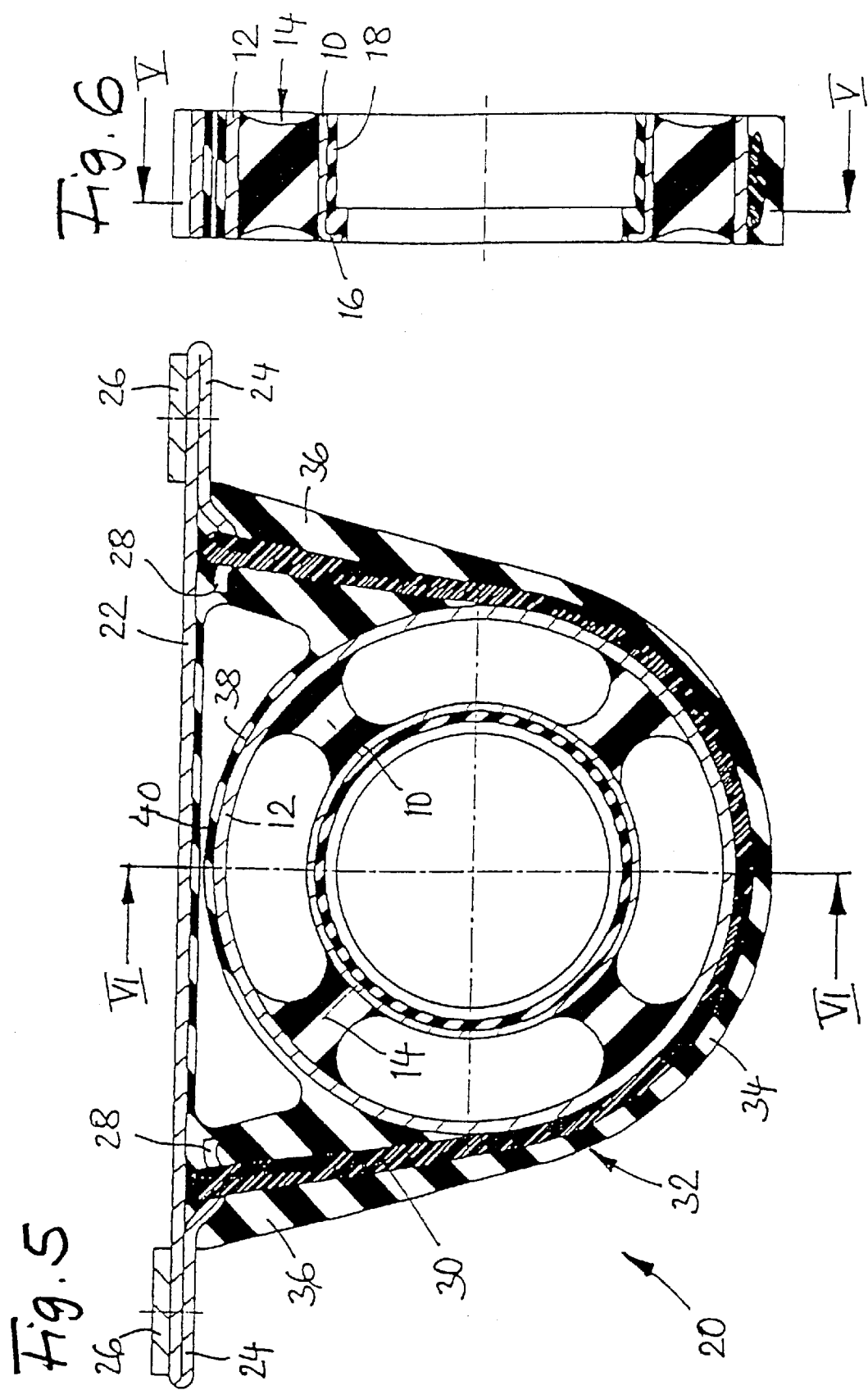

SHAFT SUSPENSION SYSTEM FOR DRIVE SHAFTS OF MOTOR VEHICLES

BACKGROUND OF THE INVENTION

1. Field of the Invention

The invention relates to a shaft suspension system particularly suitable for drive shafts in drive assemblies of motor vehicles.

2. Description of the Related Art

In known shaft suspensions of this type (see JP 100 53 035A, for example) the inner ring and the outer ring are normally made from steel and the connecting member is a rubber bellows, for example, vulcanized to the said two rings. The bearing support is a steel bracket which surrounds the outer ring on its circumference but leaves its front faces free. The outer race of a roller bearing, in which a section of a drive shaft is supported, is pressed into the inner ring of the shaft suspension. When designing such known shaft suspensions there is a conflict of goals because on the one hand the resilient connecting member has to be sufficiently rigid to deal with static and dynamic shaft forces, whereas on the other hand it is desirable to design the connecting member as soft as possible in order to keep the transmission of structure-borne noise from the drive shaft and its shaft bearing to the load absorbing object, in particular the bottom of a motor vehicle, as little as possible.

It is the object of the invention to design a shaft suspension system in such a manner that on the one hand it can be subjected to considerable static and dynamic shaft forces but on the other hand prevents to a considerable extent the transmission of structure-borne noise from a shaft and its shaft bearing to the load-absorbing object.

According to the invention, this object is met in that the shaft suspension system has a rigid inner ring designed for receiving a shaft bearing, a rigid outer ring surrounding the inner ring with radial clearance, a resilient connecting member bridging the clearance between inner ring and outer ring, and a bearing support which extends about the outer ring and includes lugs for fastening it to a load-absorbing object, wherein the bearing support is composed of a support plate on which the lugs are secured, a flexible loop which is suspended from the support plate and extends around the outer ring, and an elastomer member into which the loop is embedded.

BRIEF DESCRIPTION OF THE DRAWING

Exemplary embodiments of the invention will be explained in more detail below with reference to schematic drawings, in which:

FIG. 1 shows a first shaft suspension in vertical section I—I from FIG. 2;

FIG. 2 shows the first shaft suspension in vertical section II—II from FIG. 1;

FIG. 3 shows a second shaft suspension in vertical section III—III from FIG. 4;

FIG. 4 shows the second shaft suspension in vertical section IV—IV from FIG. 3;

FIG. 5 shows a third shaft suspension in vertical section V—V from FIG. 6;

FIG. 6 shows the third shaft suspension in vertical section VI—VI from FIG. 5.

DETAILED DESCRIPTION OF THE INVENTION

The first embodiment of a shaft suspension according to the invention illustrated in FIGS. 1 and 2 comprises an inner ring 10 and a coaxially arranged outer ring 12 which are made from a circular cylindrical section of a steel tube each and are connected with one another by a connecting member 14 embodied by a bellows of rubber or synthetic material vulcanized to them. The inner ring 10 is at one end provided with a radially inwardly flanged collar 16 and comprises a lining 18 of rubber or synthetic material.

The outer ring 12 is retained in a composite component which in its entirety is called bearing support 20 and is designed for being fastened to a load-absorbing object (not shown), in particular on the bottom of a motor vehicle.

The bearing support 20 has a symmetrical configuration relative to plane II—II of FIG. 1 vertical in normal position of assembly and relative to plane I—I of FIG. 2 normally also vertical, and comprises a support plate 22 which is punched from sheet steel and includes a pair of lugs 24 each having a reinforcing piece 26 welded to it for fastening the bearing support to the said load-absorbing object. A pair of depressions 28 is formed in the support plate 22 both of which are hook-shaped in FIG. 1. An endless, flexible loop 30 is suspended from both depressions 28 as a further component of the bearing support 20. Said loop 30 is made from one or several strands of steel wire or yarns of natural or synthetic fibers and extends from one of the two depressions 28 around the outer ring 12, in direct contact with the outer circumferential surface thereof, up to the second depression 28.

The flexible loop 30 as well as the outer circumferential surface of the outer ring 12 are completely embedded in an elastomer member 32 of rubber or rubber-like synthetic material which, as a further component of the bearing support 20, is vulcanized or injection molded to the underside of the support plate 22 in such a manner that its depressions 28 as well are completely embedded in the elastomer member. The elastomer member 32 comprises an outer arc-shaped region 34, a pair of legs 36 which have a cross-section considerably thicker than the outer arc-shaped region 34 and connect the same with the support plate 22, as well as an inner arc-shaped region 38 whose cross-section according to FIGS. 1 and 2 is clearly thinner than the outer arc-shaped region. The elastomer body 32 covers, between its two legs 36, with its also relatively thin layer the underside of the support plate 22 so that only a small gap 40 is left free there.

The outer race of a conventional shaft bearing 42 is pressed into the lining 18 of the inner ring 10. In FIG. 2 the shaft bearing 42 is illustrated as a deep groove ball bearing and provided to support a shaft section 44 of a drive shaft.

The bearing support 20, and thus the entire shaft suspension illustrated in FIGS. 1 and 2, provides an structure-borne noise insulation which is considerably better than in known shaft suspensions. This holds true even if the connecting member 14 is made relatively rigid and, consequently, can be subjected to considerable static and dynamic shaft forces. In addition, the bearing support 20 according to the invention allows oscillating movements in axial direction of the shaft section 44; this is another reason why the connecting member 14 may be relatively rigid without axial compensating movements of the shaft bearing 42 necessary during operation being impeded. The connecting member 14 may consequently be subjected to considerable static and dynamic shaft forces and nevertheless have a long service life.

The same applies also to the second embodiment of a shaft suspension according to the invention illustrated in FIGS. 3 and 4. It differs from the one shown in FIGS. 1 and 2 in that the outer ring 12 is not made from steel but from synthetic material and that—independently thereof—the two depressions 28 are closed indentations in which the flexible loop 30 is inserted from top.

The third embodiment of a shaft suspension according to the invention illustrated in FIGS. 5 and 6 differs from the one shown in FIGS. 1 and 2 in that the connecting member 14 between the inner ring 10 and the outer ring 12 is a sort of spoke wheel. This is only to illustrate the fact that, owing to the flexibility of the loop 30 and the elastomer body 32, there is scope for different configurations of the connecting member.

What is claimed is:

1. A shaft suspension system for drive shafts in drive assemblies of motor vehicles, comprising:
    a rigid inner ring designed for receiving a shaft bearing;
    a rigid outer ring surrounding the inner ring with radial clearance;
    a resilient connecting member bridging the clearance between inner ring and outer ring; and
    a bearing support which extends about the outer ring and includes lugs for fastening it to a load-absorbing object,
    wherein the bearing support is composed of:
        a support plate on which the lugs are secured,
        a flexible loop which is suspended from the support plate and extends around the outer ring, and
        an elastomer member into which the loop is embedded.

2. The shaft suspension system according to claim 1, wherein the support plate includes depressions for suspending the loop.

3. The shaft suspension system according to claim 2, wherein each of the depressions is arranged close to one of the lugs.

4. The shaft suspension system according to claim 2, wherein at least one of the depressions is hook-shaped.

5. The shaft suspension system according to claim 1, wherein the loop is in direct contact with a circular arc segment of the outer ring, which is averted from the support plate.

6. The shaft suspension system according to claim 5, wherein the elastomer body includes an arc-shaped region extending along the circular arc segment of the outer ring, radially outside of the loop, and two legs extending from the arc-shaped region are tangential to the outer ring and extend to the support plate.

7. The shaft suspension system according to claim 6, wherein the two legs of the elastomer body are thicker than the body portion in the arc-shaped region.

8. The shaft suspension system according to claim 6, wherein the elastomer body extends completely around the outer ring but leaves a gap between the outer ring and the support plate, which gap extends between the two legs.

9. The shaft suspension system according to claim 1, wherein the loop is prefabricated of continuous strands of material.

10. The shaft suspension system according to claim 9, wherein the continuous strands of material are comprised of wound wire or yarn.

11. The shaft suspension system according to claim 1, wherein the outer ring has a U-shaped, radially outwardly open profile in which is embedded the loop.

12. The shaft suspension system according to claim 1, the absorbing object is a motor vehicle frame.

* * * * *